US012779837B2

(12) United States Patent
Amano et al.

(10) Patent No.: US 12,779,837 B2
(45) Date of Patent: Nov. 3, 2026

(54) METHOD FOR SEPARATING GLASS

(71) Applicant: Panasonic Intellectual Property Management Co., Ltd., Osaka (JP)

(72) Inventors: Tomoki Amano, Osaka (JP); Yasuhiko Sakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 18/911,249

(22) Filed: Oct. 10, 2024

(65) Prior Publication Data

US 2025/0033346 A1 Jan. 30, 2025

Related U.S. Application Data

(63) Continuation of application No. PCT/JP2023/005271, filed on Feb. 15, 2023.

(30) Foreign Application Priority Data

Apr. 25, 2022 (JP) ................................ 2022-071802

(51) Int. Cl.
*B32B 43/00* (2006.01)
*B23K 26/36* (2014.01)

(52) U.S. Cl.
CPC ............ *B32B 43/006* (2013.01); *B23K 26/36* (2013.01); *B32B 2307/412* (2013.01); *B32B 2309/105* (2013.01); *B32B 2310/0843* (2013.01); *B32B 2315/08* (2013.01); *B32B 2509/00* (2013.01)

(58) Field of Classification Search
CPC .............................. B32B 43/006; B23K 26/36
See application file for complete search history.

(56) References Cited

U.S. PATENT DOCUMENTS

| | | | |
|---|---|---|---|
| 2005/0233547 | A1 | 10/2005 | Noda et al. |
| 2011/0073847 | A1 | 3/2011 | Kobayashi et al. |
| 2012/0329123 | A1 | 12/2012 | Nakashima et al. |
| 2019/0280574 | A1 | 9/2019 | Shirai et al. |
| 2020/0234993 | A1 | 7/2020 | Prenger et al. |
| 2022/0073801 | A1 | 3/2022 | Ogino et al. |

FOREIGN PATENT DOCUMENTS

| | | |
|---|---|---|
| CN | 1703773 | 11/2011 |
| JP | 2011-076767 | 4/2011 |
| JP | 4934942 B2 * | 5/2012 |
| JP | 2013-126723 | 6/2013 |

(Continued)

OTHER PUBLICATIONS

Machine translation JP4934942B2 (Year: 2012).*

(Continued)

*Primary Examiner* — Jacob T Minskey
*Assistant Examiner* — Wayne K. Swier
(74) *Attorney, Agent, or Firm* — Wenderoth, Lind & Ponack, L.L.P.

(57) ABSTRACT

Plate-like glass 2 having a print layer bonded to base material 5 by adhesive layer 4 can be separated in a layer form from article 1 by irradiating print layer 3 with laser light 6, carbonizing an organic component on an entire surface of the print layer through irradiation, and separating the print layer in a layer form.

3 Claims, 5 Drawing Sheets

(56) References Cited

FOREIGN PATENT DOCUMENTS

| | | | | | |
|---|---|---|---|---|---|
| JP | 2015-199794 | | | 11/2015 | |
| JP | 5875850 | | | 3/2016 | |
| JP | 6009540 | B | | 10/2016 | |
| JP | 2019-155375 | | | 9/2019 | |
| WO | WO-2007049064 | A1 | * | 5/2007 | .............. B41M 5/26 |
| WO | 2011/108503 | | | 9/2011 | |
| WO | WO-2020100965 | A1 | * | 5/2020 | .......... H10P 72/7402 |
| WO | 2020/138240 | | | 7/2020 | |

OTHER PUBLICATIONS

Machine translation JP2013126723A (Year: 2013).*
Machine translation WO2020100965A1 (Year: 2020).*
Machine translation WO2020138240A1 (Year: 2020).*
Extended European Search Report dated Jun. 26, 2025 for the related European Patent Application No. 23795865.7.
International Search Report of PCT application No. PCT/JP2023/005271 dated Apr. 4, 2023.

* cited by examiner

METHOD FOR SEPARATING GLASS

TECHNICAL FIELD

The present invention relates to a method for separating glass, the method including separating plate-like glass in a layer form by carbonizing only a print layer present between glass and an adhesive layer with laser light.

BACKGROUND ART

Due to economic activities of mass consumption and mass disposal, global environmental problems such as global warming and resource depletion have arisen.

Under such circumstances, the Home Appliance Recycling Act has been enforced in Japan since April 2001 in order to construct a resource recycling society. The Home Appliance Recycling Act requires mandatory recycling of used home appliances (air conditioners, televisions, refrigerators, freezers, washing machines, clothes dryers, and the like). Thus, used home appliances are crushed into small pieces in home appliance recycling plants, and then sorted and collected by material types using magnetism, wind, vibration, or the like, and recycled as recycled materials.

In recent years, products using glass instead of a conventional metal plate or resin on the surface of home appliances are increasing because of their high designability. Examples of the products using glass include refrigerators, washing machines, and IH stoves.

However, when considered from the viewpoint of recycling, glass used for a glass door of a glass door refrigerator accounts for 7% to 8% of the weight of the refrigerator body, and it is expected to greatly affect a future home appliance recycling rate. In addition, it is assumed that glass causes problems such as wear of a blade of a crusher in a recycle plant (RP), or contamination of glass debris in a post-process. As of 2022, the problem has not become apparent because the amount is small, but it is conceivable that glass is mixed into recycled materials due to an increase in the amount of glass used as a product. As a result, the recycled material is handled as industrial waste, and there is a concern about a decrease in the recycling rate. Thus, a technique for removing glass is required in the pre-process of crushing the recycled product.

However, it is difficult to easily remove glass from a product. This is because, in the structure in which a design glass is bonded to a base material, the glass and the base material are firmly bonded to each other entirely with an adhesive material, and thus, it is very difficult to separate the glass from the product. In addition, if the glass is separated while being crushed, it is not possible to recycle the separated glass, and thus it is necessary to separate the glass in the form of one sheet of glass.

PTL 1 proposes a method in consideration of the above problem. As a background of the development of this method, a chemical reaction such as softening, melting, foaming, and decomposition is caused to occur by irradiating an object to be separated with laser light in recycling a smartphone, causing a print layer to absorb the laser light and generate heat, and propagating the heat to an adhesive layer. It is a method of separating glass from a product by reducing the adhesive force in these reactions.

CITATION LIST

Patent Literature

PTL 1: Japanese Patent No. 6009540

SUMMARY OF THE INVENTION

A method for separating glass according to one aspect of the present invention is a method for separating glass for separating a plate-like glass from an article including a surface to which the plate-like glass is attached, the method including:

- irradiating a print layer containing an organic component with laser light through the plate-like glass, the article including an adhesive layer and the print layer between the plate-like glass and a base material of the article, the adhesive layer being closer to the base material than the print layer is;
- carbonizing the organic component on an entire surface of the print layer through the irradiation of the print layer with the laser light; and
- separating the plate-like glass from the article by separating the print layer in a layer form.

DESCRIPTION OF EMBODIMENT

The invention according to PTL 1 is effective in that design printing can be made separable at an adhesive layer using heat generated by laser light.

However, in the method of propagating heat, it is assumed that it takes time to become a separable state in the case of a large product such as a refrigerator, compared with a small product such as a smartphone. In addition, in the structure bonded with an adhesive material, the softened adhesive layer is fixed again to resin or glass with time after the irradiation of laser light, and thus separation becomes eventually impossible. Thus, when considering application to a wide variety of products, it is necessary to reduce the influence of re-fixing by treating only the print layer rather than causing a chemical reaction in the adhesive material.

The present invention has been made to solve the above conventional problems, and an object of the present invention is to provide a method for separating glass, the method including separating glass in a layer form from an article by carbonizing only a print layer with laser light without damaging the adhesive layer in a structure in which glass is bonded to a base material.

Hereinafter, an exemplary embodiment of the present invention will be described in detail below with reference to the drawings.

Exemplary Embodiment

Figure 1:
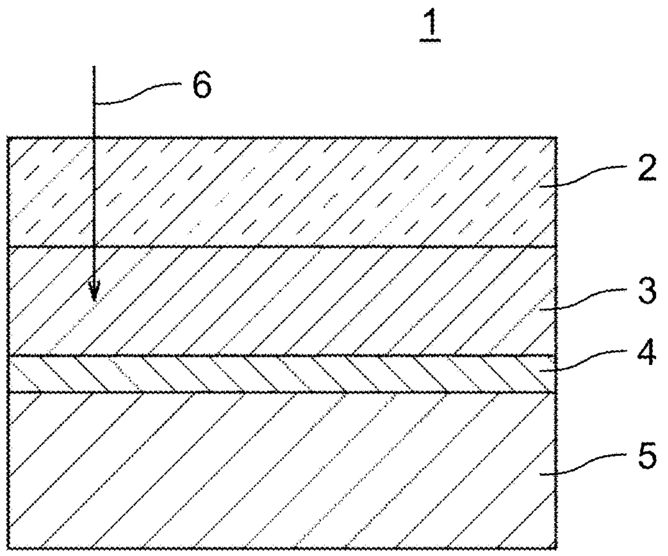
FIG. 1 is a schematic view of a laser treatment according to an exemplary embodiment of the present invention.
Figure 2:
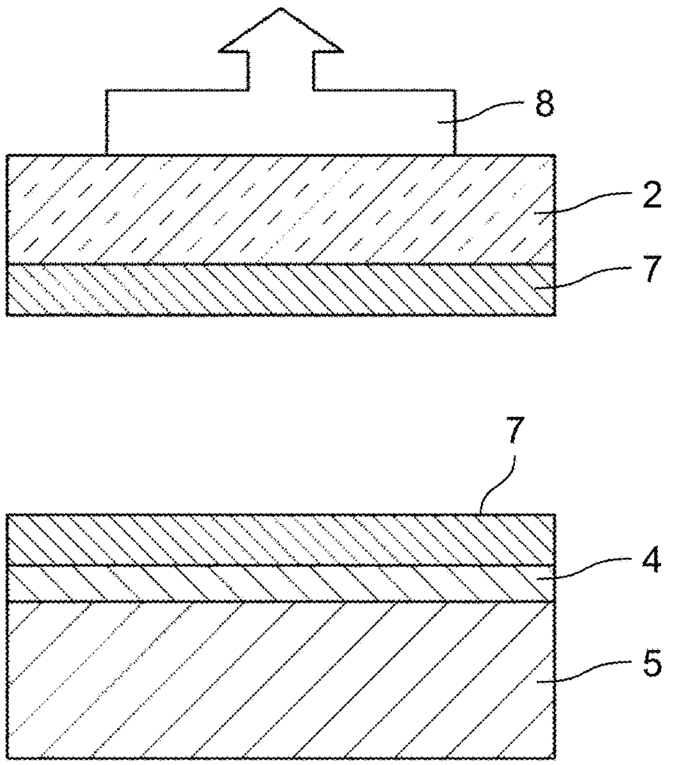
FIG. 2 is a schematic view of a separation method according to the exemplary embodiment of the present invention.

Irradiation sample 1 illustrated in FIG. 1 as an example of an article has a structure in which print layer 3 is present on the back surface of plate-like glass 2, and print layer 3 is bonded to base material 5 of an article by adhesive layer 4. In other words, in irradiation sample 1, adhesive layer 4 and print layer 3 containing an organic component are provided between plate-like glass 2 and base material 5 of irradiation sample 1 such that adhesive layer 4 is on the base material side. Laser light 6 emitted from the upper side of the glass side of irradiation sample 1 passes through plate-like glass 2 and is absorbed inside print layer 3, and thus, print layer 3 is carbonized and changed into print layer carbide 7 as illustrated in FIG. 2.

Plate-like glass 2 can be made of, for example, soda glass, borosilicate glass, or the like. Plate-like glass 2 may be colorless and transparent, but it may be colored as long as most of laser light 6 can pass therethrough.

Print layer 3 is formed using various printing methods such as offset printing, gravure printing, and screen printing.

The components of print layer 3 are composed of, for example, organic and inorganic compounds, and are deposited, printed, or stuck to glass. However, since it is necessary to finally carbonize, it is necessary to contain a compound containing a carbon atom and an organic substance. The component of the organic coating may be one having an azo group or a polycyclic organic compound such as phthalocyanine or quinone.

The print layer 3 does not transmit laser light 6. Not transmitting laser light 6 means a state in which laser light 6 is absorbed when laser light 6 is emitted.

A vapor deposited metal film may be provided between print layer 3 and plate-like glass 2. In this case, it is necessary to decompose the vapor deposited metal film through laser irradiation and to realize separation in a layer form in print layer 3.

Examples of the adhesive material constituting adhesive layer 4 include an acrylic adhesive material. As the adhesive material, an elastomer-based adhesive material may be used, and in this case, for example, an acrylic elastomer, a urethane-based elastomer, a polyolefin-based elastomer, or a styrene-based elastomer can be exemplified. As the adhesive material, a typical rubber-based adhesive material may also be used. As the adhesive material, not only a single adhesive material but also an adhesive material applied to the surfaces of a base material such as a double-sided tape may be used. Different types of adhesive materials may be mixed as the adhesive material.

Base material 5 is, for example, resin, metal, ceramic, or urethane foam, and it needs to be able to be bonded to adhesive layer 4.

The type of laser light 6 is not particularly limited, and examples thereof include a solid laser such as an Nd: YAG laser, and a short pulse laser such as a nanosecond laser. In particular, when the improvement of the processing speed is taken into consideration, the beam profile is performed with the top hat instead of the Gaussian, whereby the improvement of the processing speed can be realized while suppressing the thermal influence on adhesive layer 4.

The wavelength of laser light 6 is preferably more than or equal to 300 nm and less than or equal to 3 μm, and particularly preferably more than or equal to 355 nm and less than or equal to 2 μm. Setting the wavelength of this laser light to the above range of more than or equal to 300 nm and less than or equal to 3 μm makes it possible to achieve carbonization of print layer 3 with an optimum laser output through plate-like glass 2 and to improve the carbonization efficiency and reliability.

The separation method illustrated in FIG. 2 illustrates that print layer carbide 7 is formed by carbonizing print layer 3 after irradiation with laser light 6, and print layer carbide 7 attached to a surface of plate-like glass 2 is separated from irradiation sample 1 by using separation tool 8.

Print layer carbide 7 is formed by carbonizing print layer 3 through irradiation with laser light 6.

It is desirable that separation tool 8 can fix only a surface of plate-like glass 2, and for example, an adsorption pad capable of adsorbing and holding a surface of glass 2 can be used.

Here, an example of a method for separating glass according to the exemplary embodiment will be described with reference to FIG. 3.

Figure 3:
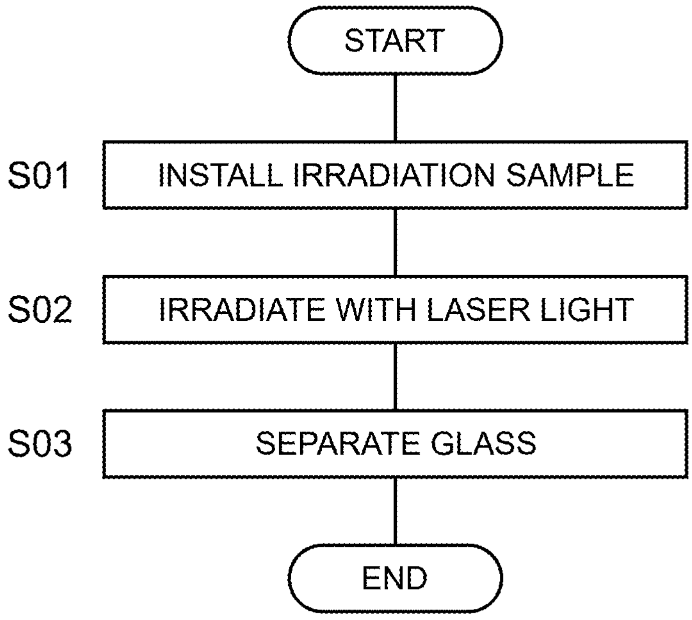
FIG. 3 is a flowchart according to the exemplary embodiment of the present disclosure.

FIG. 3 is a flowchart according to the exemplary embodiment.

In the present exemplary embodiment, the method was performed by using a refrigerator glass door as irradiation sample 1.

In step S01, irradiation sample 1 is installed to perform irradiation with laser light 6. In Examples, irradiation sample 1 was a refrigerator glass door. The thickness of print layer 3 is 5 μm to 200 μm. Irradiation sample 1 is installed so as to be perpendicular to laser light 6 at the shortest distance to the surface of plate-like glass 2.

Next, in step S02, laser light 6 is emitted through plate-like glass 2 and applied to print layer 3 of irradiation sample 1. Laser light 6 oscillated at a wavelength of 1064 nm with an output of 200 W and a pulse of 70 nanoseconds to 600 nanoseconds. The refrigerator glass door was irradiated with laser light 6 so that the entire surface of print layer 3 was carbonized. As a scanning method, a laser galvanometer was used to generate line light in accordance with the size of the door glass, and scanning was performed at a scanning speed of 10 m/s to 40 m/s. The focus diameter was 410 μm. The number of times of irradiation with laser light 6 may be one or a plurality of times. The thermal influence on adhesive layer 4 can be suppressed by irradiating the same portion with laser light 6 set to low output and gradually treating print layer 3 when the thickness of print layer 3 is small. This makes it possible to perform separation in irradiation sample 1 having thin print layer 3.

Next, in step S03, glass is separated from irradiation sample 1 treated in step S02. After it is confirmed that print layer 3 is changed to print layer carbide 7, separation tool 8 is installed on a surface of plate-like glass 2. As separation tool 8, an adsorption pad capable of adsorbing and holding a surface of glass 2 was used. That is, the surface of plate-like glass 2 is adsorbed and held by the adsorption pad, then a force is applied to plate-like glass 2 using the adsorption pad in a direction opposite to the direction in which adhesive layer 4 is present, whereby print layer carbide 7 separates in a layer form, and plate-like glass 2 separates from the refrigerator glass door.

Figure 4:
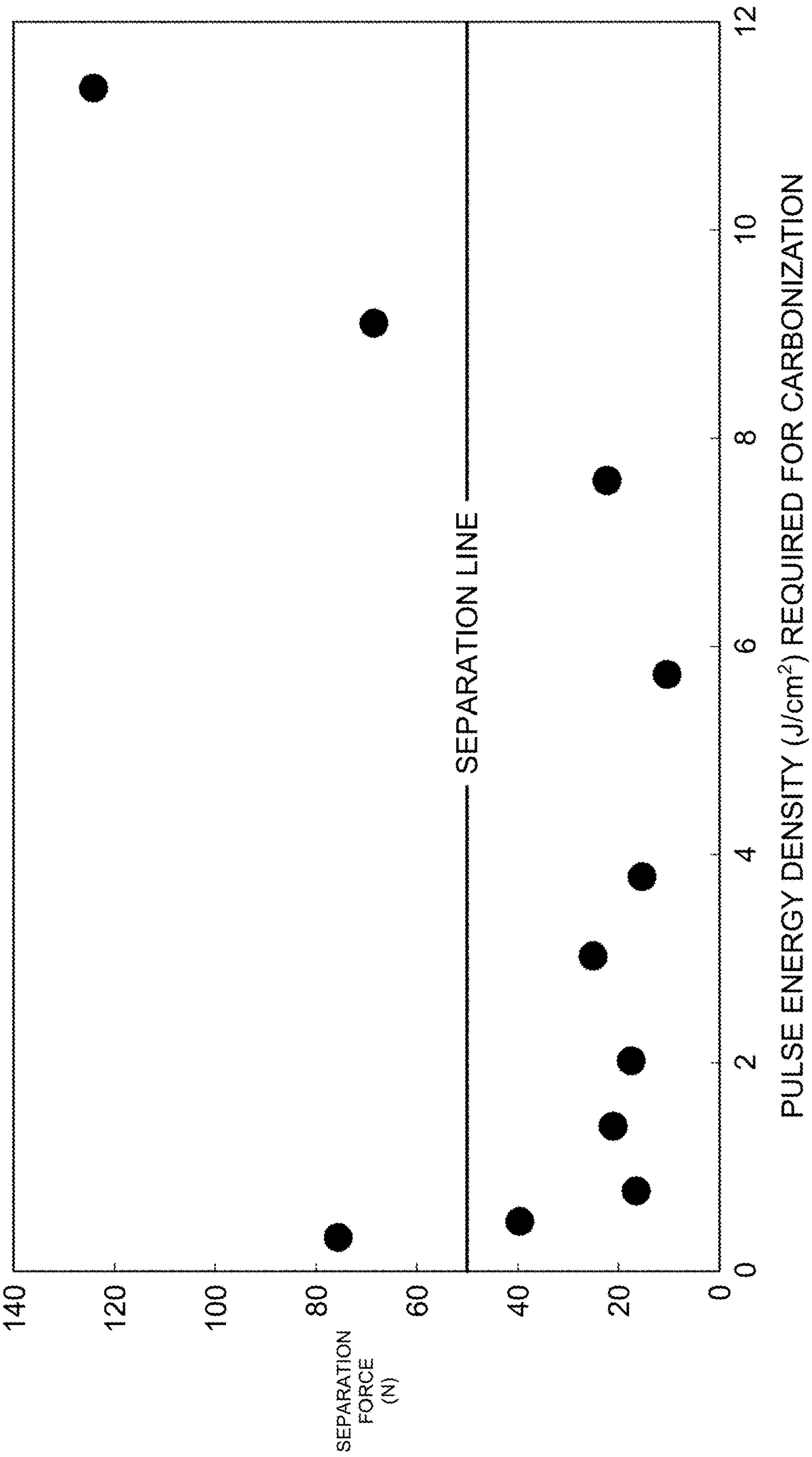
FIG. 4 is a graph showing a relationship between the pulse energy density obtained in the exemplary embodiment of the present invention and the pulling force applied at the time of separation.

FIG. 4 illustrates the pulse energy density necessary for carbonizing print layer 3. This time, it was defined that the separation work was possible when the force applied when the adsorption pad was used was less than or equal to 50 N. This is because the value was considered as the force with which manual work can be continuously performed in the separation method using separation tool 8. As a result, separation work was possible when the pulse energy density was more than or equal to 0.5 $J/cm^2$, and separation work was impossible when the pulse energy density was more than 9.0 $J/cm^2$. It is considered that when the pulse energy density is less than 0.5 $J/cm^2$, separation cannot be performed because energy required for carbonization is insufficient. On the other hand, when the pulse energy density was more than 9.0 $J/cm^2$, carbonization itself was possible, but separation work was impossible because not only print layer 3 but also adhesive layer 4 was melted due to propagation of laser energy to adhesive layer 4, and plate-like glass 2 was precipitated.

Figure 5:
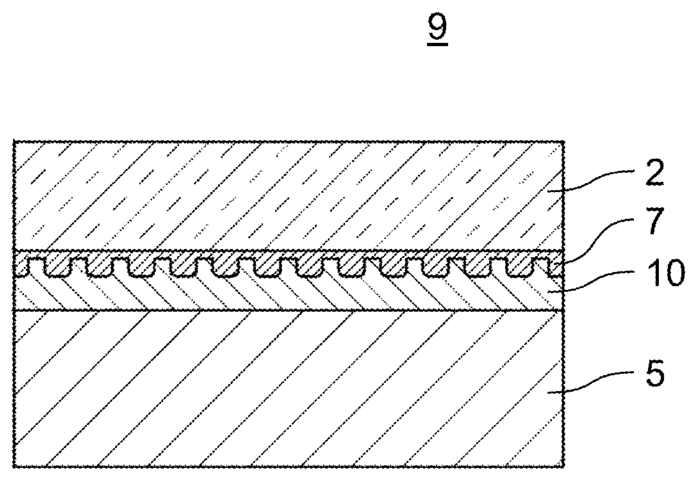
FIG. 5 is a schematic view when separation cannot be realized due to high energy according to the exemplary embodiment of the present invention.

This phenomenon is illustrated in FIG. 5. In sample 9 after high energy irradiation, print layer carbide 7 is mixed with adhesive layer 4 because of laser irradiation to form adhesive layer melt 10. Formed adhesive layer melt 10 is naturally cooled on the surface of plate-like glass 2 with the lapse of time, and thus, the adhesive layer melt 10 is fixed at the time of performing the separation work. It is considered that, as a result, the separation work was impossible at the time of high energy.

The pulse energy required to carbonize print layer 3 is at least more than or equal to 0.5 J/cm$^2$, but when there is reserve power of the pulse energy with respect to the laser output, it is possible to process an area having a size of more than or equal to a beam diameter while utilizing the influence of thermal diffusion in an energy density region where adhesive layer 4 does not melt.

Figure 6:
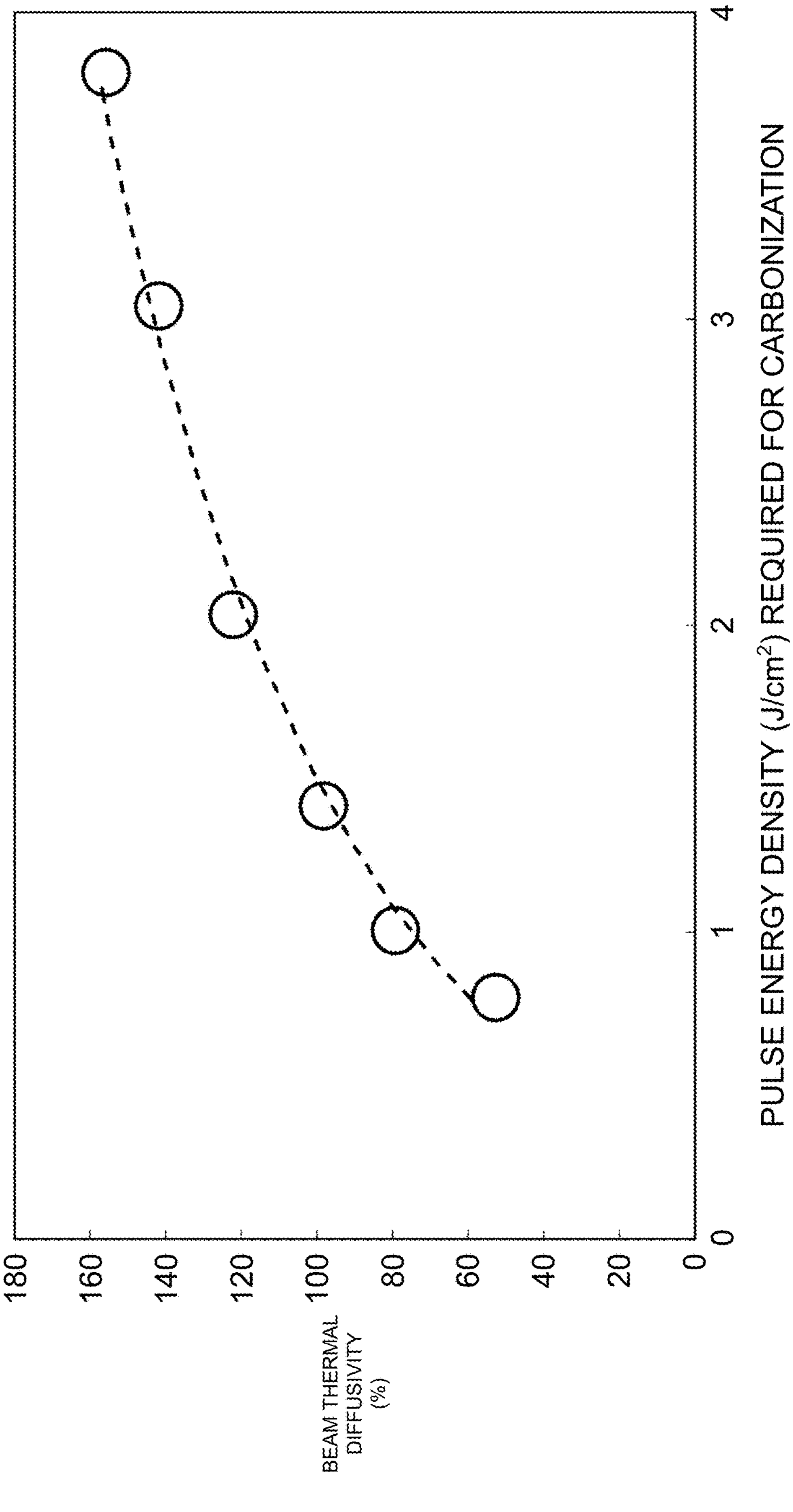
FIG. 6 is a graph showing a relationship between the pulse energy density and the beam thermal diffusion obtained in the exemplary embodiment of the present invention.

FIG. 6 shows the relationship between the pulse energy density and the beam thermal diffusivity. When the pulse energy density was 1.4 J/cm$^2$, the processed diameter was almost the same as the beam diameter, and it was found that the beam thermal diffusivity increased as the pulse energy density increased. When an approximate line is drawn from this result, an approximate curve expressed by Formula (1) shown below can be drawn.

$$\text{Beam thermal diffusivity } P = 63.518\ \ln x + 75.812 \quad (1)$$

Here, P is the beam thermal diffusivity, and x is the pulse energy density.

When considered in relation to the pulse energy density required for carbonization based on Formula (1), it was found that the beam thermal diffusivity is 32% at the pulse energy density of 0.5 J/cm$^2$, and the beam thermal diffusivity is 215% at the pulse energy density of 9.0 J/cm$^2$.

In the separation method according to this example, it is necessary to carbonize the entire surface of print layer 3. Adopting the pulse energy density having a high thermal diffusivity makes it possible to increase the treatment area per pulse, and an effect of shortening the treatment time can be expected.

In this manner, according to the method for separating glass according to the exemplary embodiment, the organic component on the entire surface of print layer 3 is carbonized by irradiating print layer 3 with laser light 6, and print layer 3 is separated in a layer form, whereby plate-like glass 2 having print layer 3 bonded to base material 5 with adhesive layer 4 can be separated in a layer form from article 1.

Here, to separate glass 2 where a printing is applied adjacent to adhesive layer 4 without breaking glass 2, it is necessary to inactivate an adhesive component between glass 2 and an article, for example, the adhesive component on an entire surface of a refrigerator door. However, in the structure bonded by adhesive layer 4, after irradiation with laser light 6, softened adhesive layer 4 is fixed again to resin or glass 2 with time, and thus, separation becomes impossible. Thus, considering the application to a wide variety of products, the influence of re-fixing can be reduced by treating only print layer 3.

Thus, by carbonizing only print layer 3 using laser light 6 without damaging adhesive layer 4 present between glass 2 and base material 5, separation of glass 2 in a layer form from base material 5 is realized. That is, plate-like glass 2 can be separated in a layer form from article 1 by irradiating print layer 3 with the laser light 6 through glass 2 to carbonize an organic component on the entire surface of print layer 3 and separating print layer 3 in a layer form.

By appropriately combining any exemplary embodiments or modifications among the various exemplary embodiments or modifications described above, it is possible to achieve the effect possessed by each of them. Combination of exemplary embodiments, combination of examples, or combination of exemplary embodiments and examples are possible, and features in different exemplary embodiments or examples are also possible.

As described above, according to the method for separating glass according to the aspect of the present invention, a plate-like glass having a print layer bonded to a base material with an adhesive layer can be separated in a layer form from the article by irradiating the print layer with laser light to carbonize an organic component on the entire surface of the print layer, and separating the print layer in a layer form.

INDUSTRIAL APPLICABILITY

From the above description, the method for separating glass according to the aspect of the present invention can separate a plate-like glass having a print layer bonded to a base material with adhesive layer 4 at a high speed, and it can be applied to a large-sized product such as a refrigerator or an IH stove in addition to a small product such as a smartphone.

REFERENCE MARKS IN THE DRAWINGS

1 irradiation sample
2 plate-like glass
3 print layer
4 adhesive layer
5 base material
6 laser light
7 print layer carbide
8 separation tool
9 sample after high energy irradiation
10 adhesive layer melt

The invention claimed is:

1. A method for separating glass for separating a plate-like glass from an article including a surface to which the plate-like glass is attached, the method comprising:

irradiating a print layer containing an organic component with laser light through the plate-like glass, the article including an adhesive layer and the print layer between the plate-like glass and a base material of the article, the adhesive layer being closer to the base material than the print layer is;

carbonizing the organic component on an entire surface of the print layer through the irradiating of the print layer with the laser light; and separating the plate-like glass from the article by separating the print layer in a layer form, wherein a beam thermal diffusivity after the irradiating of the print layer with the laser light is greater than or equal to 32% and less than or equal to 215%.

2. The method for separating glass according to claim 1, wherein the print layer has a thickness of 5 μm to 200 μm, and in the irradiating of the print layer with the laser light, the laser light has a pulse energy density of greater than or equal to 0.5 $J/cm^2$ and less than or equal to 9 $J/cm^2$.

3. The method for separating glass according to claim 1, wherein in the irradiating of the print layer with the laser light, the laser light has a wavelength of greater than or equal to 300 nm and less than or equal to 3 μm.

* * * * *